Dec. 23, 1969    L. J. GUILBAULT    3,485,789
PULVERULENT COATING COMPOSITIONS AND
FLUIDIZED BED COATING METHOD
Filed May 20, 1966
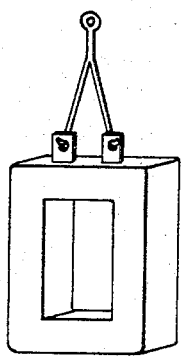
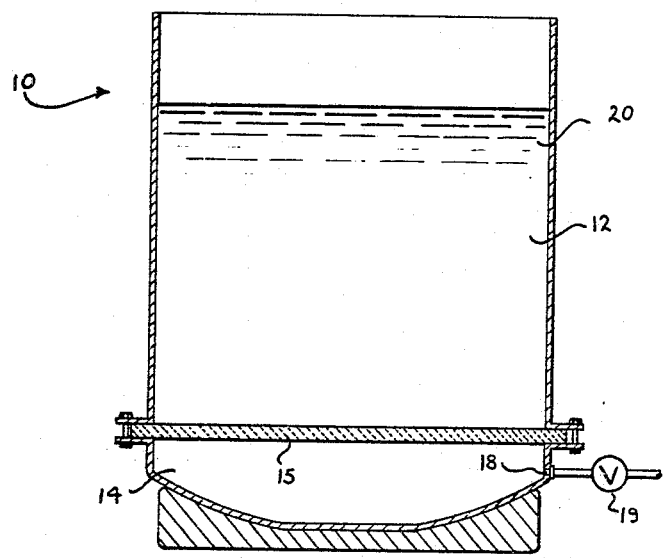
INVENTOR.
LAWRENCE J. GUILBAULT
BY
HIS ATTORNEY United States Patent Office 3,485,789
Patented Dec. 23, 1969

3,485,789
PULVERULENT COATING COMPOSITIONS AND
FLUIDIZED BED COATING METHOD
Lawrence J. Guilbault, Wesleyville, Pa., assignor to General Electric Company, a corporation of New York
Filed May 20, 1966, Ser. No. 551,730
Int. Cl. C08g 51/10; B44d 1/095
U.S. Cl. 260—40                10 Claims

ABSTRACT OF THE DISCLOSURE

A coating composition and method of preparing the same, in which fibers having a diameter of about 0.005 inch or less and an average length of about 0.01 inch to about 0.10 inch are mixed with film forming material suitable for use with a fluid bed coating process, having a granular size of about 0.001 inch to about 0.024 inch, with the resulting coating composition having improved properties when applied as a film, in comparison with the properties of the film forming material alone used as a film.

This invention relates to coating compositions and more particularly to new and improved coating compositions adapted for use in fluidized bed type coating processes and to a method of coating articles thereby. Although the invention is valuable and applicable to the production of improved coatings for a wide variety of articles, it is especially useful and valuable for the production of electrical insulating coatings for electrical members, such as coils, and will be more particularly described in that connection.

In the fluidized bed coating process, such as described, for example, in U.S. Patent No. 2,844,489, the coating composition, in the form of a dry powder, is placed in a fluidized state by means of an upward flow of a gas, such as air. The article to be coated is heated above the melting temperature of the coating composition and is immersed in the fluidized bed to be removed therefrom when the desired coating thickness has been obtained.

As is known, the fluidized bed process has certain advantages over other types of coating processes. For example, with the fluidized bed process, it is possible to coat articles of irregular and complex shapes quickly and uniformly. Further, this process provides coatings which are substantially thicker than can be obtained by the methods which employ liquid coating compositions.

In spite of these distinct advantages, none of the coating compositions heretofore usable in such fluidized bed processes have been entirely satisfactory for use in coating electrical members, such as, for example, coils for dynamoelectric machines and the like, which are subjected to elevated temperatures. It is well known that the coating employed for such members must withstand extremes of mechanical, electrical and chemical, as well as thermal stresses. Moreover, especially for use in coating electrical coils and the like, the coating composition must have the ability to bridge voids, provide good corner coverage and have an acceptable build rate while still providing a coating which resists thermal degradation and maintains high impact and dielectric strength at elevated temperatures. It is an object of this invention, therefore, to provide a pulverulent coating composition adapted for use in a fluidized bed coating process which achieves the foregoing desiderata.

It is another object of this invention to provide a fluidized bed applied coating which is uniform and includes a substantially uniform distribution of discrete length fibers throughout.

It is another object of this invention to provide a pulverulent coating composition adapted for use in the fluidized bed coating process which is capable of forming a coating having a new and improved combination of mechanical, chemical and thermal properties the particular balance of which is especially suitable for use as a coating for electrical members.

It is a further object of this invention to provide a pulverulent coating composition adapted for use in the fluidized bed coating process and which provides a coating which is thermally stable at temperatures of at least 200° C. for extended periods of time.

A still further object of this invention is to provide a method for preparing improved pulverulent coating compositions adapted for use in the fluidized bed coating process.

Yet another object of this invention is to provide an improved method of coating electrical members adapted for use continuously at temperatures of at least 180° C.

Unexpectedly, I have discovered that uniform continuous coatings having a unique and significantly improved combination of electrical, mechanical and thermal properties can be produced by the fluidized bed type process from a coating composition comprising an intimate mixture of a pulverulent film forming material having a granular size in the range of about 0.001 to 0.024 inch and fibers, preferably glass fibers, having a diameter of about .0005 inch or less and an average length of about 0.01 to about 0.10 inch.

Although glass fibers are preferred for use in providing electrically insulating coatings having an especially desirable combination of mechanical, electrical and thermal properties for coating electrical members, such as coils, fibers of other materials such as, for example, asbestos, polyamide, silicon carbide and other organic and ceramic fibers are also suitable.

The novel features believed characteristic of the invention are set forth with particularity in the appended claims. The invention itself, however, both as to its organization and method of operation, together with further objects and advantages thereof, may best be understood by reference to the following description taken in conjunction with the accompanying drawing, the sole figure of which schematically illustrates a sectional view of a simple form of apparatus being employed to coat a coil for a dynamoelectric machine by the fluidized bed process.

Apparatus suitable for use in coating articles by the fluidized bed process is fully described in U.S. Patent No. 2,844,489 to Gemmer. The figure of the accompanying drawing herein illustrates a similar simple and basic form of suitable apparatus. As shown, the apparatus includes an open-topped container 10 constructed of any suitable material. Container 10 is divided horizontally into an upper chamber 12 and a lower chamber 14 by a gas-pervious partition 15.

Container 10 is provided with a gas inlet opening 18 which is adapted for connection through a shut-off valve 19 to a suitable source of gas under pressure (not shown) in order to pressurize the lower chamber 14. The upper chamber 12 is adapted to confine the pulverulent coating material 20. Accordingly, partition 15 should be pervious to the gas used but impervious to the particles of coating material. Conveniently, the partition 15 takes the form of a porous ceramic plate having an average pore diameter in the range from 0.003 to 0.004 inch or less.

In the practice of the process, a quantity of a very finely divided coating material is placed in the upper chamber 12 of container 10 and a gas, such as air, under pressure is admitted through the connection 18 into the lower, or pressure chamber 14. The gas from lower chamber 14 passes through the gas-pervious partition 15 and flows as a parallel upward flow from the upper surface of partition 15 and through the finely divided or pulverulent coating material. This upward flow of gas sets the particles of coating material in motion to cause the formation of the fluidized bed which is a combination of solid particles of coating material and the fluidized gas such that the bed appears and feels like a liquid.

In the fluidized bed processes as heretofore practiced, the coating material must be employed in pulverulent form which introduces requirements for the coating composition which are unlike those heretofore encountered in connection with compositions for use in the other known processes which employ liquid compositions, for example. Moreover, it has always heretofore been taught that the coating material should have a granular size of between about 0.001 and about 0.024 inch with best results being obtained with a granular size of between 0.002 and about 0.012 inch. Accordingly, although various synthetic thermosetting resin materials are known in the art which are thermally stable at temperatures of about 150–200° C. for extended periods of time, such materials when processed for use as a suitable pulverulent material for use in the fluidized bed process have not been capable of providing an entirely satisfactory electrical insulating coating.

For example, the epoxy, or ethoxyline, resins such as described in U.S. Patents Nos. 2,324,483, 2,444,333, 2,494,295, 2,500,600, 2,511,913 and others, are known to have extremely desirable properties for use as electrical insulation and have been widely employed for that purpose in the prior art. Coatings of such materials applied to articles by the fluidized bed coating process, however, have been found to degrade rapidly when subjected to temperatures above about 200° C.; such coatings exhibiting severe cracking and reduction of both their impact and dielectric strength after only a relatively short period of time in such elevated temperature environments.

Also certain polyester resins, especially those described in U.S. Patent Nos. 2,936,296, Precopio et al. and 2,889,304, Sheffer et al., were known to have especially desirable properties for use as electrical insulation. Coatings incorporating such polyester resin materials applied by the fluidized bed process, however, have not heretofore possessed the same combination or balance of electrical, mechanical, chemical and thermal properties. One of the reasons for this appears to be that such fluidized bed polyester type coatings soften at the elevated temperatures and are, therefore, prone to mechanical damage. Another reason seems to be related to the curing mechanism of the polyester resins. That is, the polyester resins cure by a condensation mechanism which evolves water. When heavy coatings are applied, such as is often desirable and can be readily provided by the fluidized bed process, the surface region gels first during the cure tending to trap the moisture evolved and actually causing foaming of the coating with a consequent decrease in the electrical, mechanical and thermal properties of the overall coating. As a result, the single coat thickness which may be applied is limited undesirably.

Coating compositions adapted for use in the fluidized bed process have been employed in the prior art which include film forming material particles, curing agent particles and pigment or other filler material particles. Satisfactory coating compositions have always been employed in pulverulent form having a granular size of between about 0.001 and about 0.024 inch with the best coating results being obtained with a granular size of between 0.002 and about 0.012 inch. Moreover, an excessive spread in the particle size range has usually been avoided in such coating compositions, although compositions have been employed in the prior art which include a minor proportion of filler materials of a much smaller granular size, such as, for example, in the range of from about 0.01 to 5 microns. Mixtures of different particle sizes have always been found in the prior art to suffer the disadvantage of being inherently non-uniform. Moreover, it has always heretofore been found that under the action of the gas flow in the fluidized bed type apparatus such a mixed particle size composition would become even more non-uniform tending to produce a non-uniform coating on an article immersed in a fluidized bed thereof.

Consideration, therefore, has been given in the art to coating compositions for use in the fluidized bed type processess which were composed of mixtures of film forming material particles, curing agent particles, and other ingredients, such as pigments and fillers, in particle form. Insofar as I am aware, however, the art was devoid, prior to this invention, of coating compositions suitable for use in the fluidized bed processes which contained fibers of discrete length. Moreover, in view of all the prior art teachings and experiences any mixture of a pulverulent material and fibers of discrete lengths should be inherently non-uniform and tend to become even more non-uniform under the action of the gas flow in the fluidized bed type apparatus so that the coatings on the articles would be not only non-uniform but quite likely noncontinuous as well.

Wholly unexpectedly, and contrary to the teachings of the prior art, I have discovered that uniform and continuous coatings having an unexpectedly improved combination and balance of electrical, mechanical and thermal properties can be produced by the fluidized bed process by employing a coating composition comprising an intimate mixture of a film forming material having a granular size in the range of about 0.001 and about 0.024 inch and fibers, preferably glass fibers, having a diameter of about .0005 inch or less and an average length of about 0.01 to about 0.10 inch.

More specifically, a coating composition in accord with the invention comprises an intimate mixture of from about 60 to 95 weight percent, preferably from about 80 to 90 weight percent, of a film forming material, preferably a thermosetting resin film forming material, and from about 5 to 40 weight percent, preferably from about 10 to 20 weight percent, fibers, preferably glass fibers, having a diameter of about .0005 inch or less and an average length of about 0.01 to 0.10 inch and preferably an average length of about 0.020 to about 0.060 inch.

In a specific preferred embodiment of the invention which produced electrically insulating coatings for coils of dynamoelectric machines having especially outstanding characteristics at elevated temperatures, the coating composition comprised an intimate dry blend of (1) about 88.9 weight percent of an epoxy resin and a curing agent therefor having a granular size of between about 0.001 and about 0.024 inch and (2) about 11.1 weight percent glass fibers having a diameter of about .0005 inch and an average length of about 1/32 inch.

The present invention is valuable and applicable to the production of improved coatings and especially applies to the production of improved coatings from the organic thermosetting polymers, preferably the epoxy and polyester type polymers such as those described in the foregoing referenced patents. Such polymers require the addition of a suitable curing agent for proper curing, which curing may take place at room temperature or at a suitable elevated temperature as is well known.

The pulverulent thermosetting film forming material may be provided in any of various ways well known in the art. For example, the thermosetting polymer as well as the curing agent therefor may be obtained in solid form having a suitable granular size, or the materials may be suitably ground to such size and mixed together.

Alternatively, the thermosetting polymer and curing agent may be prepared initially as a melt which is thereafter cooled and ground to the desired granular size for use in the fluidized bed process. For example, the thermosetting polymer may be introduced into a hot roll mill, or other suitable apparatus for heating and mixing ingredients. After the polymer is molten, any desired pigments or fillers may be introduced into the resin and the mixture milled between the hot rolls until a smooth uniform liquid dispersion is obtained. The selected amount of curing agent, in either solid or liquid form, may then be added to the molten mixture and milling continued to completely disperse the curing agent in the resin-filler melt. The melt is then removed from the hot roll mill and allowed to cool after which the material is ground to the desired granular size. Each particle thus contains resin and curing agent in the proper proportion determined by the proportions of resin and curing agent provided in the melt.

In still another alternative a suitable thermosetting film forming composition comprising a thermosetting resin and a curing agent therefor together with various fillers or pigments may be obtained commercially in pulverulent form having a granular size adapted for use in the fluidized bed coating process. For example, a polyester resin coating composition of such type is manufactured and sold by the Insulation Materials Department of the General Electric Company under the designation ALKANEX 1003 Polyester Powder. An epoxy type fluidized bed material is also manufactured and sold by that department under the designation 882–031. Other similar materials are also available commercially from various well known suppliers of thermosetting polymers.

In accordance with one aspect of this invention, fibers having an average length of about 0.01 to about 0.10 inch are dry blended with the thermosetting film forming material so provided. Specifically, about 5 to 40 weight percent glass fibers having a diameter of about .0005 inch or less and an average length of about 0.01 to about 0.10 inch is added to the powdered thermosetting film forming material, the granular size of which is between about 0.001 and about 0.024 inch. The glass fibers so added are dry blended with the pulverulent film forming material in such manner that a dry intimate mixture is obtained without destroying the integrity of the fibers. This may be accomplished by blending in a suitable apparatus such as, for example, a ball mill, a V-shell blender, a Cowles dissolver or the like. The dry blended mixture of film forming material and fibers is not only homogeneous but retains its homogeneity during extended periods of fluidization and provides uniform coatings having a network of fibers throughout, all of which is surprising in view of the size of the fibers blended with the film forming material.

Preferably, the glass fibers used in the practice of this invention are of a suitably cleaned but unsized type since sizing has a tendency to keep the glass fibers agglomerated which, of course, is undesirable. Moreover, sizing on the glass fibers adversely affects the aging characteristics of the coating composition.

The following specific examples are given to provide a further detailed description of the invention. The examples are provided for purposes of illustration and explanation only, however, and are not intended as limiting the invention.

EXAMPLE I 100 parts by weight of Epon–1002, which is an epoxy resin of the bisphenol epichlorohydrin type manufactured by the Shell Chemical Corporation, is introduced onto a two roll hot roll mill maintained at a temperature of about 75 to 85° C. After the resin is molten 50 parts by weight 200 mesh silica, 5 parts by weight fumed silica and 1 part by weight blue pigment are added to the resin and milling between the rolls continued for about 10 minutes to provide a smooth uniform liquid dispersion. The selected curing agent is then added. Specifically, 3 parts by weight of $BF_3$–400 are added to the resin-filler mixture and rolling continued for about 5 minutes to achieve a complete uniform dispersion of the $BF_3$–400 curing agent in the melt. $BF_3$–400 is a boron trifluoride-monoethylamine commercially available from the Allied Chemical Corporation.

The mixture is then removed from the rolls, cooled and ground in a hammer mill so that all of the material will pass a −70 mesh screen.

800 grams of the foregoing epoxy resin filler curing agent mixture is added in a suitable container to 100 grams of heat cleaned, unsized, milled glass fibers of 1/32 inch length and a diameter of about .0005 inch. Twelve one inch diameter alumina balls are placed in the container and the container is sealed tightly and rolled for two hours at a speed of about 80–85 r.p.m. The material is then removed from the container and screened through a −20 mesh screen. A residue of one gram or less of the glass fibers on the screen indicates that the blending of the glass fibers with the resin-curing agent material is satisfactory. That is, the residue (of glass fibers) should be no more than about 1 weight percent. The material is then rescreened through a −40 mesh screen equipped with a vibrator.

A steel bar the dimensions of which were ½″ x ½″ x 2½″ was coated with the foregoing composition in the following manner employing fluidized bed apparatus of the foregoing described type. The bar was preheated to 200° C. and immersed for about 5 seconds in a fluidized bed of the foregoing described coating composition after which the bar was placed in an oven at 200° C. for two hours to cure the coating. The fluidizing gas used was nitrogen at a pressure of about 15 p.s.i. and a temperature of about 70° F. The coating was found to be uniform with a thickness of about 30 mils and good coverage at the corners of the bar. After curing the coating had a hard semi-glossy surface. A microscopic examination of the cured coating showed a uniform dispersion of glass fibers throughout. The sample coated in the foregoing described manner will be identified hereafter as "Sample A."

A control sample, hereafter identified as "Sample B," was provided by similarly coating a bar with a composition comprising the mixture of epoxy resin and the curing agent but without glass fibers dry blended therewith. Both samples A and B were placed in an oven at 225° C. to thermally age the coating.

After about 250 hours of such aging Sample B, the control sample, exhibited advanced thermal degradation with severe cracking and crazing. Sample A, the sample coated with the composition of this invention, exhibited no cracking or crazing whatever even after aging at 225° C. for more than 2000 hours. Some other physical properties of the two coatings are compared in Table I below:

TABLE I

| Property | Sample A | Sample B |
| --- | --- | --- |
| Percent corner coverage | 65–75% | 55–58%. |
| Flat build | 0.043–0.048 inch | 0.030–0.035 inch. |
| Build rate | 4.5–5.2 mils/sec | 3.0–3.5 mils/sec. |
| Impact strength | 45–52 in. lbs | 30–40 in. lbs. |

In addition the foregoing coating composition tended to bridge holes and voids significantly better than the conventional resin-curing agent film forming material. This property is an especially important one when the article to be coated is an electrical member, such as a coil, which has many voids and separations between the windings.

EXAMPLE II

An electrical coil having a shape adapted for use in a dynamoelectric machine is wound in the conventional manner using a suitable magnet wire. The wound coil is heated to a temperature of 200° C. and dipped three times, for periods of about 5 seconds each, into a fluidized bed of the epoxy resin, curing agent and glass fibers composition prepared as set forth in Example I. The fluidizing gas used is also the same as in Example I, that is, nitrogen at a pressure of about 15 p.s.i. and a temperature of about 70° F. The coil is then placed in a 200° C. oven for about two hours to cure the coating.

The coil so coated was aged at 225° C. for more than 2000 hours and was found to exhibit no noticeable cracking or crazing. A similar coil coated with the epoxy resin and curing agent material without the glass fibers blended therein exhibited severe cracking and generally advanced thermal degradation of the coating after only about 250 hours of aging at 225° C.

EXAMPLE III 3,200 grams of ALKANEX 1003 polyester powder, which is a polyester fluidized bed coating composition sold by the General Electric Insulation Materials Department, and 400 grams of heat cleaned, unsized, milled glass fibers having a diameter of about .0005 inch and a length of about 1/32″ were introduced into the V-shell of a Patterson-Kelly Blender. The V-shell was then sealed and rotated at a speed of about 32.3 r.p.m. after which the intensifier bar was rotated at a speed of about 2,300 r.p.m. The ALKANEX 1003 polyester powder and 1/32″ glass fibers were blended together in this manner for about 30 minutes. The resulting mixture was then screened through a 20 mesh U.S. standard screen. Retention on the screen of no more than 4 grams of glass fibers, no more than 1 weight percent, indicates satisfactory incorporation of the glass fibers with the polyester powder.

A steel bar the dimensions of which were 1/2″ x 1/2″ x 2½″ was coated in the following manner employing fluidized bed apparatus of the type described. The bar was preheated to 200° C. and immersed for about 5 seconds in a fluidized bed of the foregoing described polyester-glass fiber coating composition after which the bar was placed in an oven at 200° C. for 2 hours to cure the coating. The fluidizing gas used was nitrogen at a pressure of about 15 p.s.i. and a temperature of about 70° F.

Microscopic examination of the coating revealed a uniform dispersion of glass fibers throughout providing a dense reinforcing network. The physical properties of this sample "C" were compared with a control sample "D" which sample was coated by being immersed in a fluidized bed of ALKANEX 1003 polyester powder. The results of this comparison are given in Table II below.

TABLE II

| Property | Sample C | Sample D |
| --- | --- | --- |
| Percent corner coverage | 60-70% | 30-35%. |
| Flat build | 0.023″-0.025″ | 0.014″-0.016″. |
| Build rate | 2.3-2.6 mils/sec | 1.5-1.6 mils/sec. |
| Impact strength | 40-43 in.-lbs | 25-28 in.-lbs. |

From the foregoing it is apparent that sample C, coated in accordance with this invention, has a significantly improved corner coverage, build rate and impact strength. Moreover, with the polyester-glass fiber mixture it was possible to apply thick coatings without any noticeable foaming. The bridgeability of the composition incorporating the glass fibers was also much better than that of the ALKANEX 1003 powder alone making such composition especially useful for coating articles, such as coils and the like, having many voids. Although both sample C and the control sample D were substantially similar in their resistance to thermal degradation at a temperature of 225° C. for extended periods, the polyester-glass composition coated sample C resisted mechanical damage much better at such elevated temperatures.

While I have described particular embodiments of the invention, it will be apparent to those skilled in the art that many changes and modifications may be made without departing from the invention. It is intended in the appended claims, therefore, to cover all such changes and modifications as fall within the true spirit and scope of the invention.

What I claim as new and desire to secure by Letters Patent of the United States is:

1. A coating composition adapted for use in the fluidized bed type processes comprising: an intimate mixture of
   (1) from about 60 to 95 weight percent of discrete particles of a film forming material which can be heated to its sintering temperature without degradation and having a granular size within the range of about 0.001 and about 0.024 inch and
   (2) from about 5 to 40 weight percent fibers having a diameter of about .0005 inch or less and an average length of about 0.01 to about 0.10 inch.

2. The coating composition of claim 1 wherein the range of (1) is from about 80 to 90 weight percent and the range of (2) is from about 10 to 20 weight percent.

3. The coating composition of claim 1 wherein the fibers are glass fibers.

4. The coating composition of claim 3 wherein said glass fibers have an average length of about 0.020 to about 0.060 inch.

5. The coating composition of claim 1 wherein said film forming material includes a thermosetting resin and a curing agent therefor.

6. The coating composition of claim 1 wherein the film forming material is present in a proportion of about 88.9 weight percent and the fibers are present in a proportion of about 11.1 weight percent.

7. The coating composition of claim 6 wherein said fibers are glass fibers.

8. The coating composition of claim 6 wherein said fibers have an average length of about 0.020 to about 0.060 inch.

9. A coating composition of claim 1 wherein said film forming material consists of thermal setting resins from the group consisting of polyester and epoxy resins and said fibers have an average length of about 0.01 inch to about 0.03 inch.

10. A coating composition of claim 1 wherein said fibers have an average length of about 0.01 inch to about 0.06 inch.

References Cited

UNITED STATES PATENTS

| | | | |
| --- | --- | --- | --- |
| 2,804,438 | 8/1957 | Biefeld et al. | 260—40 |
| 3,039,987 | 6/1962 | Elbling. | |
| 3,098,054 | 6/1963 | Rosenberg et al. | |
| 3,102,043 | 8/1963 | Winthrop et al. | |
| 3,102,823 | 9/1963 | Manasia et al. | |
| 3,151,095 | 9/1964 | Stone | 260—40 |
| 3,288,747 | 11/1966 | Sussman | 260—40 |

MORRIS LIEBMAN, Primary Examiner

H. H. FLETCHER, Assistant Examiner

U.S. Cl. X.R.

260—37; 117—21